(12) United States Patent
Kanda et al.

(10) Patent No.: US 6,297,916 B1
(45) Date of Patent: Oct. 2, 2001

(54) IMAGING LENS FOR INTERFEROMETRIC DEVICE

(75) Inventors: Hideo Kanda; Noboru Koizumi, both of Omiya (JP)

(73) Assignee: Fuji Photo Optical Co., Ltd., Omiya City (JP)

(*) Notice: Subject to any disclaimer, the term of this patent is extended or adjusted under 35 U.S.C. 154(b) by 0 days.

(21) Appl. No.: 09/523,694

(22) Filed: Mar. 13, 2000

(30) Foreign Application Priority Data

Mar. 26, 1999 (JP) .................................................. 11-082899

(51) Int. Cl.$^7$ .............................. G02B 9/12; G02B 13/18; G02B 26/08
(52) U.S. Cl. .......................... 359/784; 359/205; 359/206; 359/719
(58) Field of Search ..................................... 359/205, 206, 359/662, 719, 784, 785, 787, 788, 790, 791, 792; 356/496, 497, 498, 511

(56) References Cited

U.S. PATENT DOCUMENTS

| | | | | |
|---|---|---|---|---|
| 4,787,723 | * | 11/1988 | Uetake ................................. | 359/785 |
| 5,055,663 | * | 10/1991 | Morimoto et al. ................. | 250/214.4 |
| 5,202,795 | | 4/1993 | Kashima ................................ | 359/645 |
| 5,650,878 | | 7/1997 | Estelle .................................... | 359/784 |
| 5,682,258 | * | 10/1997 | Yamakawa ............................ | 359/206 |
| 6,014,266 | | 1/2000 | Obama ................................... | 359/689 |

FOREIGN PATENT DOCUMENTS

| | | | | |
|---|---|---|---|---|
| 04-221704 | * | 8/1992 | (JP) ................................. | G01B/9/02 |
| 2000-249531 | * | 9/1999 | (JP) .............................. | G01B/11/30 |
| 2000-275006 | * | 10/2000 | (JP) ................................. | G01B/9/02 |

* cited by examiner

*Primary Examiner*—Georgia Epps
*Assistant Examiner*—David N. Spector
(74) *Attorney, Agent, or Firm*—Arnold International; Bruce Y. Arnold

(57) ABSTRACT

An imaging lens having three lens groups is designed so that image aberrations of an object at infinity (i.e, a collimated beam) and of an object at a finite distance are very well-corrected so that the imaging lens is particularly suitable for use imaging interference patterns formed on a screen by a grazing incidence interferometer. The imaging lens is composed of the following lens components, in successive order from the most object side: a first lens component having an overall meniscus shape with its concave surface on the object side, a second lens component having negative or positive refractive power, and a third lens component of positive or negative refractive power. The refractive power of the second lens component and the third lens component are always of opposite sign, and specified conditions are satisfied in order to assure high quality imaging. Each lens component may be formed of a single lens element or of multiple lens elements.

6 Claims, 10 Drawing Sheets

EMBODIMENT 1

EMBODIMENT 1

Fno 3.542

-0.2 mm    0.2 mm

SPHERICAL ABERRATION

EMBODIMENT 1

SPHERICAL ABERRATION

ASTIGMATISM

DISTORTION

EMBODIMENT 2

EMBODIMENT 2

Fno 4.604

-0.2 mm    0.2 mm

SPHERICAL ABERRATION

EMBODIMENT 2

Fno 10.0

-0.2 mm    0.2 mm

SPHERICAL ABERRATION

IMAGE HEIGHT 8 mm

——— S
- - - - T

-0.2 mm    0.2 mm

ASTIGMATISM

IMAGE HEIGHT 8 mm

-0.1%    0.1%

DISTORTION

EMBODIMENT 3

EMBODIMENT 3

EMBODIMENT 3

SPHERICAL ABERRATION

ASTIGMATISM

DISTORTION

EMBODIMENT 4

EMBODIMENT 4
Fno 4.668
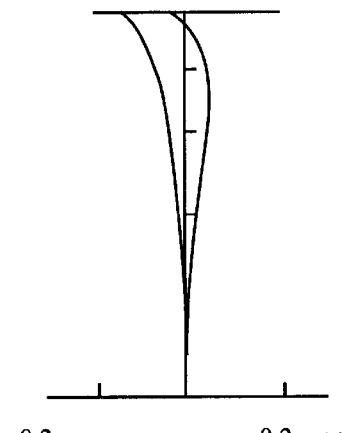
-0.2 mm    0.2 mm
SPHERICAL ABERRATION
FIG. 11
EMBODIMENT 4
Fno 9.328                IMAGE HEIGHT 10.8 mm          IMAGE HEIGHT 10.8 mm
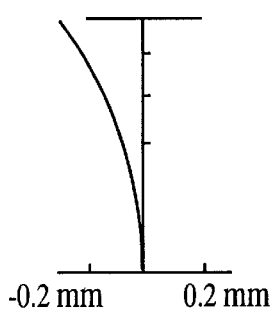         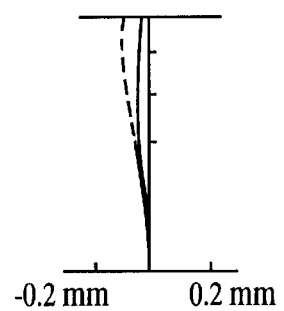              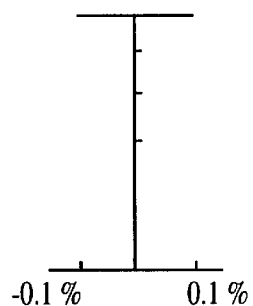
-0.2 mm   0.2 mm           -0.2 mm   0.2 mm              -0.1 %   0.1 %
SPHERICAL ABERRATION         ASTIGMATISM                    DISTORTION
FIG. 12A                    FIG. 12B                       FIG. 12C

IMAGING LENS FOR INTERFEROMETRIC DEVICE

BACKGROUND OF THE INVENTION

Grazing incidence interferometric devices which can measure the surface contours of a surface of interest by conveying a coherent light beam at grazing incidence to the surface are well-known. FIG. 15 illustrates a typical configuration of these prior art grazing incidence interferometric devices. Such a device conveys collimated, coherent light to a diffractive beam splitter 102 that divides the wave front into two light beams. One of the two light beams, termed the "object beam", is then conveyed at grazing incidence to a surface 2a and the light reflected therefrom is combined with the collimated light (termed the reference beam) which has not been reflected from the surface 2a. Diffractive beam combiner 104 redirects the reference beam so as to be combined with the object beam and travel along a common axis. Imaging lens 106 (in this case the lens of a television camera 108) then forms an interference pattern image of the surface 2a that is recorded by the television camera 108. The surface contours of the surface 2a can then be measured based on the recorded interference pattern image.

However, the lengths of the optical paths from each location on the surface 2a to the interference pattern image formed by imaging lens 106 differ. Thus, there is a problem in that distortions are formed in the interference pattern image recorded by the television camera 108. Hence, the surface contours of surface 2a cannot be accurately measured to as high a precision as would otherwise be possible.

As a partial solution to this problem, a grazing incidence interferometric device as shown in FIG. 16 is known that avoids distortions from being formed in the interference pattern image by positioning an interference pattern observation screen 110 so that its surface lies at the conjugate image of surface 2a. As is apparent from the spacing of the components in FIG. 16, the lens 106 and 112 form an optical system that relays the image of object 2a at unit magnification to interference pattern observation screen 110. As a result of the orientation of the interference pattern observation screen 110 now being conjugate to the object (i.e., the surface 2a to be measured), an interference pattern image that more accurately represents the surface 2a is formed on interference pattern observation screen 110.

The conjugate image arrangement with unit magnification is achieved as shown in FIG. 16, wherein imaging lens 106 is arranged with its focal point at a mid-point of the surface 2a, collimator lens 112 is arranged with its focal point at the image of this mid-point as formed by the imaging lens 106, and the interference pattern observation screen 110 is provided with its mid-point at the focal point of lens 112. Further, the focal distance of the lens 112 is made equal to the focal distance of lens 106, and the interference pattern observation screen is oriented so that its surface is aligned with the conjugate points of the surface 21 as imaged by lens 106 and lens 112.

An alternative prior art arrangement is shown in prior art FIG. 17, wherein a reflecting mirror 114 is arranged at the second focal point of the imaging lens 106 for conveying a bundle of rays of the interference pattern in the reverse direction. A beam splitter 116 is provided between the imaging lens 106 and the diffractive beam combiner 104 to reflect the rays from the reflecting mirror 114 to an interference pattern observation screen 110 that is, once again, provided to have its surface coincide with the conjugate image of unit magnification of the surface 2a. Once again, interference pattern images formed on interference pattern observation screen 110 are viewed by the television camera 108. In this manner the total length of the interferometric device may be prevented from becoming too long.

In the above-described grazing incidence interferometric devices shown in FIGS. 16 and 17, the surface 2a and the observation screen 110 are provided at the conjugate positions where the magnification is 1. In FIG. 16, lens 106 and lens 112 form a lens system, and object 2a and observation screen 110 are positioned with their mid-points a focal length away from this lens system so that unit magnification is achieved. Similarly, in FIG. 17, lens 106 and mirror 114 form an optical system, with object 2a and observation screen 110 again positioned in respective paths with their mid-points positioned a focal length away from the lens system so that unit magnification is achieved. In this way, the television camera 108 records the interference pattern formed by the image of object (surface 2a) and the collimated light from the reference beam, assuming the difference in path length of the object and reference beams does not exceed the coherence length of the light. Thus, instead of using collimator lens 112 as in FIG. 16 to form a unit magnification image of the surface 2a onto observation screen 110, in FIG. 17 the mirror 114 is positioned at the focus of lens 106 to redirect the light backwards through lens 106 to beam splitter 116. The unit magnification image of the surface 2a is thus formed on surface 110, and recorded by television camera 108.

The imaging requirements of such an imaging lens 106 are unique and two-fold. First, the lens 106 must generate only very small aberrations when imaging an object at infinity (i.e., the collimated light of the reference beam). Second, the lens 106 must generate only very small aberrations when imaging surface 2a at unit magnification onto surface 110. Only if both imaging requirements of the lens 106 occur with very small aberrations will the interference pattern observed by television camera 110 accurately enable the surface contours of the surface 2a to be measured accurately. When the collimator lens 112 is used as in FIG. 16, the first requirement mentioned above is nearly satisfied; however, the second requirement mentioned above is not satisfied. As a result, each single point on the surface 2a will not be imaged to a corresponding single point on the screen 110, thus causing problems in that the location of lines in the interference pattern will be imprecise, and the periphery portions of the surface 2a will appear as being out of focus.

BRIEF SUMMARY OF THE INVENTION

The object of the present invention is to provide an imaging lens for an interferometric device that can simultaneously image an object at unit magnification (i.e., light in the object beam) and can relay collimated light (i.e., light in the reference beam) while generating very low aberrations in both so as to provide a high quality interference pattern image, thereby enabling precise measurements of the object surface contours to be obtained with high accuracy.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 11 shows the spherical aberration of the lens of Embodiment 4 when imaging collimated light, FIGS. 12A–12C show the spherical aberration, astigmatism and distortion, respectively, of the lens of Embodiment 4, when imaging an object at unit magnification.

DETAILED DESCRIPTION

Figure 1:
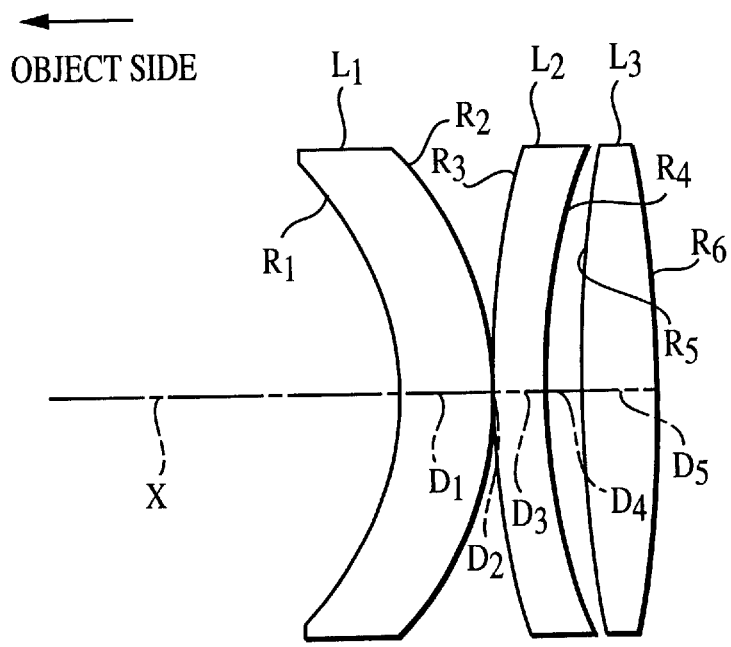
FIG. 1 shows the lens element configuration of Embodiment 1 of the present invention.

The present invention relates to an imaging lens for an interferometric device and, more particularly, relates to a triplet-type imaging lens arranged between a second diffraction grating of a grazing incidence interferometric device and a screen.

An imaging lens for an interferometric device of the present invention is formed of, in successive order from the most object side of the imaging lens, a first lens component which has an overall meniscus shape with its concave surface on the object side, a second lens component, and a third lens component.

The second and third lens components have opposite refractive power, and the following Conditions (1) and (2) are satisfied:

$-0.1 < f/f_1 < 0.6$            Condition (1)

$0.3 < d_F/d < 0.6$            Condition (2)

where f is the focal length of the imaging lens, $f_1$ is the focal length of the first lens component, $d_F$ is the distance between the surfaces of the first lens component that are nearest the object side and the image side, respectively, and d is the overall length of the imaging lens.

Moreover, when the second lens component is negative and the third lens component is positive, it is preferable that the following Conditions (3) and (4) are satisfied:

$-3.0 < f_2/f < -1.0$            Condition (3)

$0.5 < f_3/f < 1.2$            Condition (4)

where $f_2$ is the focal length of the second lens component, and $f_3$ is the focal length of the third lens component.

Further, when the second lens component is positive and the third lens component is negative, it is preferable that the following Conditions (5) and (6) are satisfied.

$0.5 < f_2/f < 1.2$            Condition (5)

$-3.0 < f_3/f < -1.0$            Condition (6)

The imaging lens of the present invention is intended for use with a grazing incidence interferometric device and, when so used, is preferably arranged between a wave front combining means of the grazing incidence interferometric device and a screen.

If Condition (1) is not satisfied, the image quality of a surface (such as surface 2a) that is imaged onto another surface will deteriorate, particularly as a result of field curvature. In other words, satisfying Conditional (1) provides favorable imaging.

Condition (2) specifies the ratio of the thickness of the first lens component $L_1$ relative to the overall length of the imaging lens. If the lower limit is not satisfied, the properties of forming the image of surface 21 onto another surface will deteriorate, particularly as a result of field curvature; on the other hand, if the upper limit is not satisfied, the first lens component $L_1$ will be too thick and the cost will be disadvantageous. In other words, in order to obtain favorable curvature of field in consideration of processing costs, Condition (2) needs to be satisfied.

Conditions (3) and (5) specify the ratio of the focal length of the second lens component relative to that of the imaging lens. If the lower limit is not satisfied, the refractive power of the second lens component will be too small and the spherical aberration when imaging an object at infinity cannot be corrected. On the other hand, if the upper limit is not satisfied, the spherical aberration when imaging an object at infinity will be over-corrected. Thus, in order to provide favorable correction of spherical aberration for a distant object, it is necessary to satisfy Condition (3) when the second lens component is negative and Condition (5) when the second lens component is positive. Furthermore, since spherical aberration will degrade the interference pattern itself, resulting in the interference pattern no longer accurately indicating the actual surface contours of surface 2a, measurement errors of surface contour will arise if the applicable Condition (3) or (5) is not satisfied.

Conditions (4) and (6) specify the ratio of the focal length of the third lens component $L_3$ relative to the focal length of the imaging lens. If the lower limit of Condition (4) or Condition (6) is not satisfied, the power of the third lens component will be too weak and the spherical aberration for a distant object will not be sufficiently corrected. On the other hand, if the upper limit of Condition (4) or Condition (6) is exceeded, the spherical aberration when imaging a distant object will be over-corrected. In other words, in order to provide favorable correction of aberration for a distant object, it is necessary to satisfy Condition (4) when the second lens component is negative and Condition (6) when the second lens component is positive.

Various embodiments of the present invention will now be explained in detail. The imaging lens of the present invention is intended to replace the imaging lens 106 as illustrated in the prior art interferometric arrangement shown in FIG. 17.

Embodiment 1

FIG. 1 shows the basic lens component configuration of the imaging lens of Embodiment 1. As shown in FIG. 1, there is arranged, in successive order from the most object side, a first lens component $L_1$ which has a negative meniscus shape with its concave surface on the object side, a second lens component $L_2$ having a negative meniscus shape with its convex surface on the object side, and a third lens component $L_3$ having a biconvex shape with surfaces of different curvature and with the surface of smaller radius of curvature on the object side. Thus, luminous flux incident from the object side along optical axis X is formed on an image surface to the right of the imaging lens.

Table 1, below, lists surface number # in order from the object side, the radius of curvature R (in mm) of each surface, the on-axis spacing D (in mm) between surfaces, as well as the refractive index $N_d$ and Abbe number $v_d$ (at the sodium d line) of each lens component of Embodiment 1.

TABLE 1

| # | R | D | $N_d$ | $v_d$ |
|---|---|---|---|---|
| 1 | −21.8298 | 6.66613 | 1.62005 | 36.3 |
| 2 | −25.0617 | 0.26664 | | |
| 3 | 62.0820 | 3.85218 | 1.62005 | 36.3 |
| 4 | 44.8530 | 2.10089 | | |
| 5 | 62.2369 | 6.35492 | 1.51633 | 64.1 |
| 6 | −99.7917 | 108.34581 | | |

Table 2 below lists the focal length f of the imaging lens, the focal length $f_1$ of the first lens component $L_1$, the focal length $f_2$ of the second lens component $L_2$, the focal length $f_3$ of the third lens component $L_3$, the overall length d of the imaging lens, the thickness $d_F$ of the first lens component $L_1$, as well as the values of the $f/f_1$, $f_2/f$, $f_3/f$ and $d_F/d$. Thus, the above-noted Conditions (1)–(4) are each satisfied for this embodiment.

TABLE 2

| | |
|---|---|
| f = 100.00 | Condition (1) value: $f/f_1$ = −0.08 |
| $f_1$ = −1287.00 | Condition (2) value: $d_F/d$ = 0.35 |
| $f_2$ = −286.57 | Condition (3) value: $f_2/f$ = −2.87 |
| $f_3$ = 75.49 | Condition (4) value: $f_3/f$ = 0.75 |
| d = 19.24 | |
| $d_F$ = 6.67 | |

As is apparent from Table 2, this embodiment satisfies Conditions (1)–(4).

Figure 2:
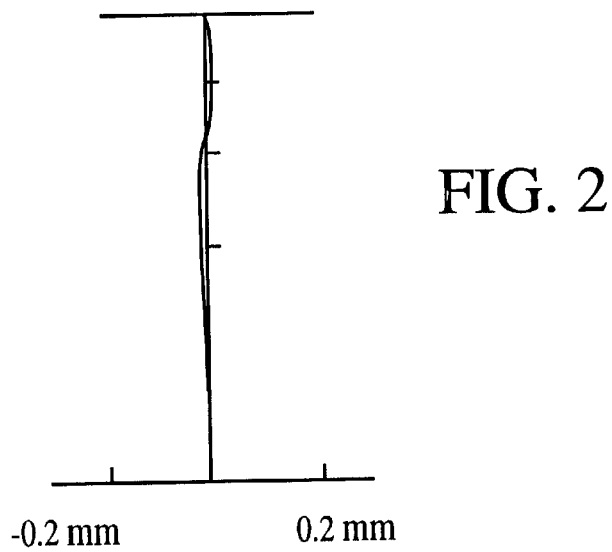
FIG. 2 shows the spherical aberration of the lens of Embodiment 1 when imaging collimated light.
Figure 13:
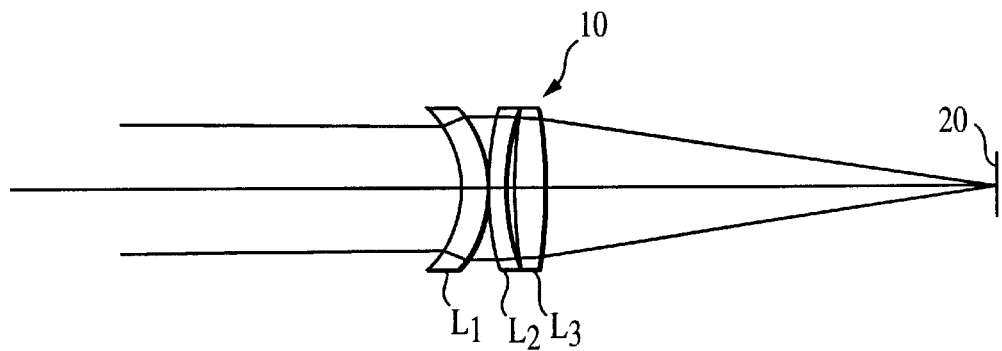
FIG. 13 shows the lens of the present invention imaging collimated light onto a planar surface normal to the optical axis (as occurs in relaying the collimated reference beam via mirror 14 in FIG. 17), and illustrates the arrangement by which the spherical aberrations shown in FIGS. 2, 5, 8 and 11 for the imaging lens of Embodiments 1–4, respectively, are generated.

FIG. 2 shows the spherical aberration of the lens of Embodiment 1 when imaging collimated light. The spherical aberration when imaging collimated light is the wave front aberration of the lens for an object at infinity imaged onto a flat surface 20, as shown in FIG. 13.

Figure 3A:
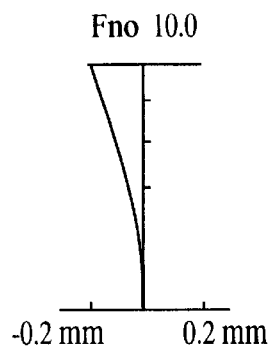
FIGS. 3A–3C show the spherical aberration, astigmatism and distortion, respectively, of the lens of Embodiment 1 when imaging an object at unit magnification.
Figure 3B:
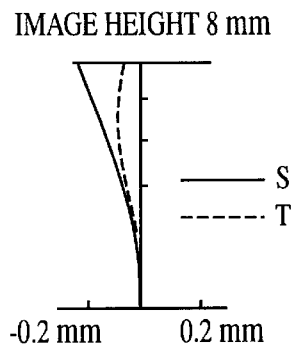
Figure 3C:
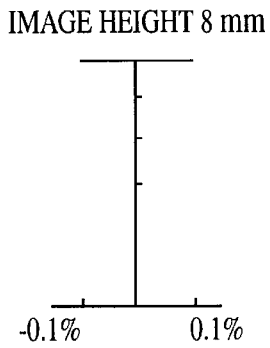
Figure 14:
FIG. 14 is a diagram illustrating unfolded ray paths of the imaging lens of the present invention when combined with a mirror 114 (as illustrated in FIG. 17) a focal distance away from the lens, and is the arrangement by which the aberrations shown in FIGS. 3, 6, 9 and 12 for Embodiments 1–4, respectively, are generated.

FIGS. 3A–3C show the spherical aberration, astigmatism and distortion, respectively, of the lens of Embodiment 1 when imaging an object at unit magnification. FIG. 14 illustrates unfolded ray paths of the arrangement by which the aberrations shown in FIGS. 3A–3C are generated.

Figure 17:
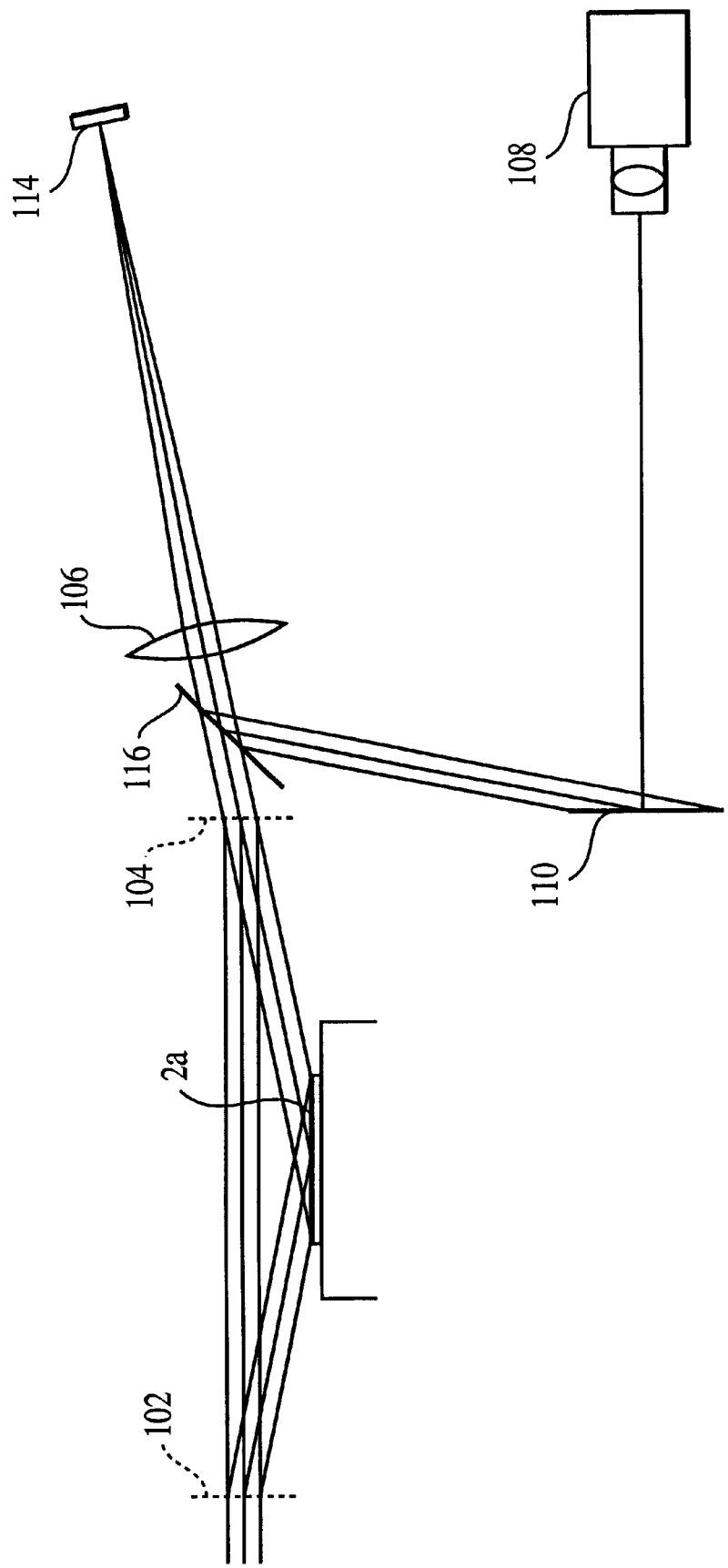
FIG. 17 is a schematic diagram for explaining still another prior art interferometric device.

Moreover, as is clear from FIGS. 2 and 3, according to the present embodiment, both the spherical aberration of the lens when imaging collimated light, as required in relaying the reference beam via mirror 114 in FIG. 17, and the various aberrations of the lens when imaging an object at unit magnification, as required for the object beam in FIG. 17, are favorably corrected by the present invention.

Embodiment 2

Figure 4:
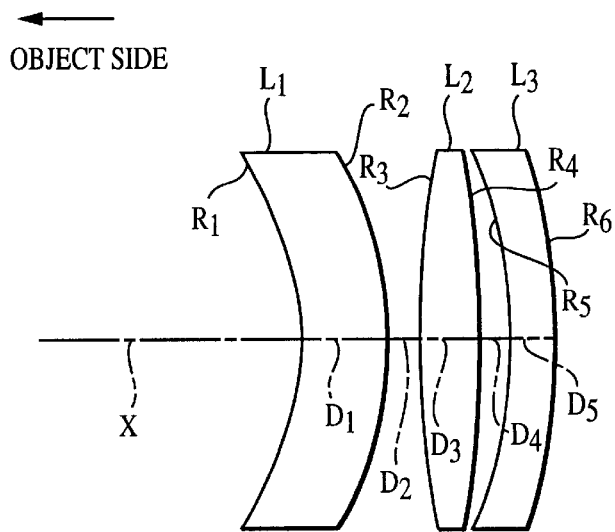
FIG. 4 shows the lens element configuration of Embodiment 2 of the present invention.

FIG. 4 shows the basic lens component configuration of the imaging lens of Embodiment 2. As shown in FIG. 4, there is arranged, in successive order from the most object side: a first lens component $L_1$ having a meniscus shape with its concave surface on the object side; a second lens component $L_2$ having a biconvex shape with surfaces of different curvature, with the surface of larger radius of curvature on the object side; and, a third lens component $L_3$ having a negative meniscus shape with its concave surface on the object side.

As with Embodiment 1, the lens of this embodiment is configured to satisfy the Conditions (1) and (2) mentioned above. Further, the imaging lens of this embodiment is configured to satisfy the above Conditions (5) and (6) instead of Conditions (3) and (4).

Table 3, below, lists surface number # in order from the object side, the radius of curvature R (in mm) of each surface, the on-axis spacing D (in mm) between surfaces, as well as the refractive index $N_d$ and Abbe number $v_d$ (at the sodium d line) of each lens component of Embodiment 2.

TABLE 3

| # | R | D | $N_d$ | $v_d$ |
|---|---|---|---|---|
| 1 | −23.1144 | 6.66622 | 1.62005 | 36.3 |
| 2 | −25.4246 | 2.66645 | | |
| 3 | 102.9098 | 4.09814 | 1.51633 | 64.1 |
| 4 | −64.8976 | 2.29848 | | |
| 5 | −41.8814 | 3.49608 | 1.62005 | 36.3 |
| 6 | −58.7888 | 106.29159 | | |

Table 4 below lists the focal length f of the imaging lens, the focal length $f_1$ of the first lens component $L_1$, the focal length $f_2$ of the second lens component $L_2$, the focal length $f_3$ of the third lens component $L_3$, the overall length d of the imaging lens, the thickness $d_F$ of the first lens component $L_1$-, as well as the values of the $f/f_1$, $f_2/f$, $f_3/f$ and $d_F/d$. Thus, the above-noted Conditions (1), (2), (5) and (6) are each satisfied for this embodiment.

TABLE 4

| | |
|---|---|
| f = 100.00 | Condition (1) value: $f/f_1$ = 0.024 |
| $f_1$ = 4103.09 | Condition (2) value: $d_F/d$ = 0.35 |
| $f_2$ = 77.98 | Condition (3) value: $f_2/f$ = 0.78 |
| $f_3$ = −256.41 | Condition (4) value: $f_3/f$ = −2.56 |
| d = 19.23 | |
| $d_F$ = 6.67 | |

As is apparent from Table 4, this embodiment satisfies Conditions (1),(2), (5) and (6).

Figure 5:
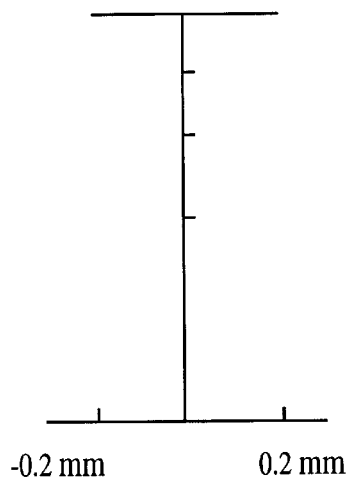
FIG. 5 shows the spherical aberration of the lens of Embodiment 2 when imaging collimated light.

FIG. 5 shows the spherical aberration of the lens of Embodiment 2 when imaging collimated light. The spherical aberration when imaging collimated light is the wave front aberration of the lens for an object at infinity imaged onto a flat surface 20, as shown in FIG. 13.

Figure 6A:
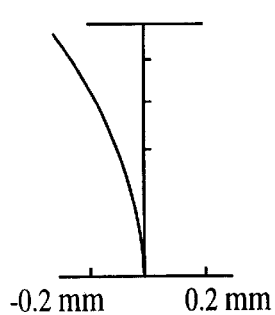
FIGS. 6A–6C show the spherical aberration, astigmatism and distortion, respectively, of the lens of Embodiment 2 when imaging an object at unit magnification.
Figure 6B:
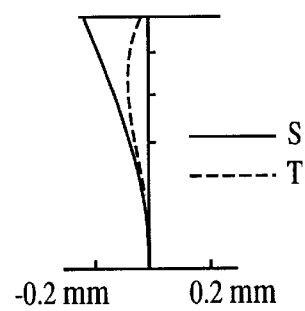
Figure 6C:
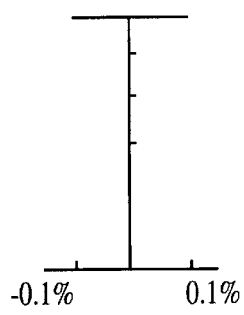

FIGS. 6A–6C show the spherical aberration, astigmatism and distortion, respectively, of the lens of Embodiment 2 when imaging an object at unit magnification. FIG. 14 illustrates unfolded ray paths of the arrangement by which the aberrations shown in FIGS. 6A–6C are generated.

Moreover, as is clear from FIGS. 5 and 6, according to the present embodiment, both the spherical aberration of the lens when imaging collimated light, as required in relaying the reference beam via mirror 114 in FIG. 17, and the various aberrations of the lens when imaging an object at unit magnification, as required for the object beam in FIG. 17, are favorably corrected by the present invention.

Embodiment 3

Figure 7:
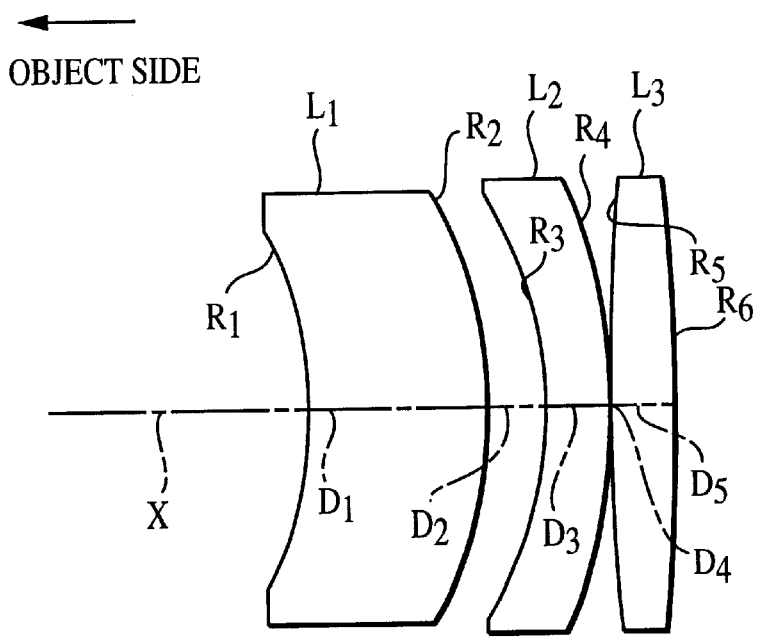
FIG. 7 shows the lens element configuration of Embodiment 3 of the present invention.

FIG. 7 shows the basic lens component configuration of the imaging lens of Embodiment 3. As shown in FIG. 7, there is arranged, in successive order from the most object side: a first lens component $L_1$ having a meniscus shape with its concave surface on the object side; a second lens component $L_2$ having a negative meniscus shape with its concave surface on the object side; and a third lens component $L_3$ of biconvex shape having surfaces of different curvature with the surface of larger radius of curvature on the object side.

Table 5, below, lists surface number # in order from the object side, the radius of curvature R (in mm) of each surface, the on-axis spacing D (in mm) between surfaces, as well as the refractive index $N_d$ and Abbe number $v_d$ (at the sodium d line) of each lens component of Embodiment 3.

TABLE 5

| # | R | D | $N_d$ | $v_d$ |
|---|---|---|---|---|
| 1 | −25.334 | 10.751 | 1.80518 | 25.4 |
| 2 | −25.681 | 3.574 | | |
| 3 | −24.724 | 3.844 | 1.51633 | 64.1 |
| 4 | −37.542 | 0.107 | | |
| 5 | 218.676 | 3.806 | 1.80518 | 25.4 |
| 6 | −124.687 | 121.248 | | |

Table 6 below lists the focal length f of the imaging lens, the focal length $f_1$ of the first lens component $L_1$, the focal length $f_2$ of the second lens component $L_2$, the focal length $f_3$ of the third lens component $L_3$, the overall length d of the imaging lens, the thickness $d_F$ of the first lens component $L_1$, as well as the values of the $f/f_1$, $f_2/f$, $f_3/f$ and $d_F/d$. Thus, the above-noted Conditions (1)–(4) are each satisfied for this embodiment.

TABLE 4

| | |
|---|---|
| f = 100.00 | Condition (1) value: $f/f_1 = 0.54$ |
| $f_1$ = 183.97 | Condition (2) value: $d_F/d = 0.49$ |
| $f_2$ = −156.68 | Condition (3) value: $f_2/f = -1.57$ |
| $f_3$ = 99.90 | Condition (4) value: $f_3/f = -1.00$ |
| d = 22.08 | |
| $d_F$ = 10.75 | |

As is apparent from Table 6, this embodiment satisfies Conditions (1)–(4).

Figure 8:
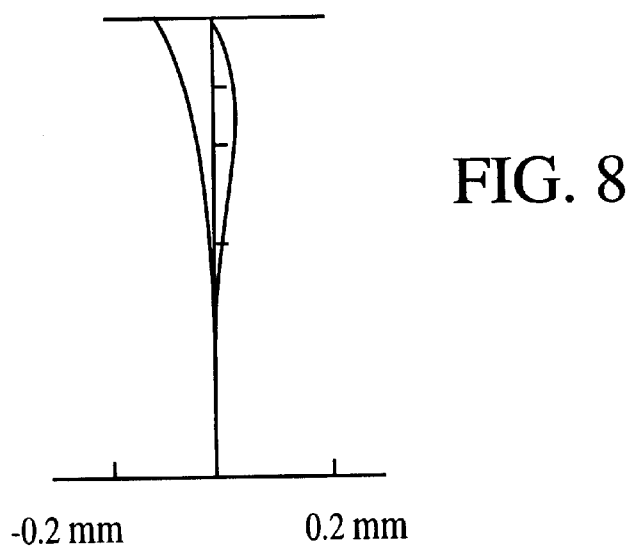
FIG. 8 shows the spherical aberration of the lens of Embodiment 3 when imaging collimated light.

FIG. 8 shows the spherical aberration of the lens of Embodiment 3 when imaging collimated light. The spherical aberration when imaging collimated light is the wave front aberration of the lens for an object at infinity imaged onto a flat surface 20, as shown in FIG. 13.

Figure 9A:
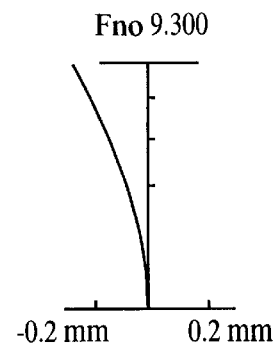
FIGS. 9A–9C show the spherical aberration, astigmatism and distortion, respectively, of the lens of Embodiment 3 when imaging an object at unit magnification.
Figure 9B:
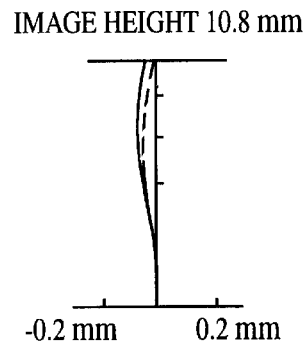
Figure 9C:
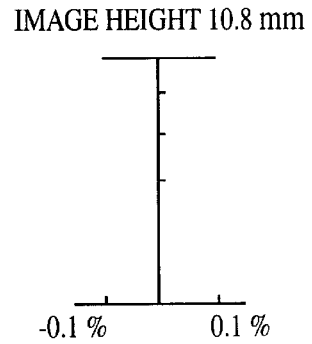

FIGS. 9A–9C show the spherical aberration, astigmatism and distortion, respectively, of the lens of Embodiment 3 when imaging an object at unit magnification. FIG. 14 illustrates unfolded ray paths of the arrangement by which the aberrations shown in FIGS. 9A–9C are generated.

Moreover, as is clear from FIGS. 8 and 9, according to the present embodiment, both the spherical aberration of the lens when imaging collimated light, as required in relaying the reference beam via mirror 114 in FIG. 17, and the various aberrations of the lens when imaging an object at unit magnification, as required for the object beam in FIG. 17, are favorably corrected by the present invention.

Embodiment 4

Figure 10:
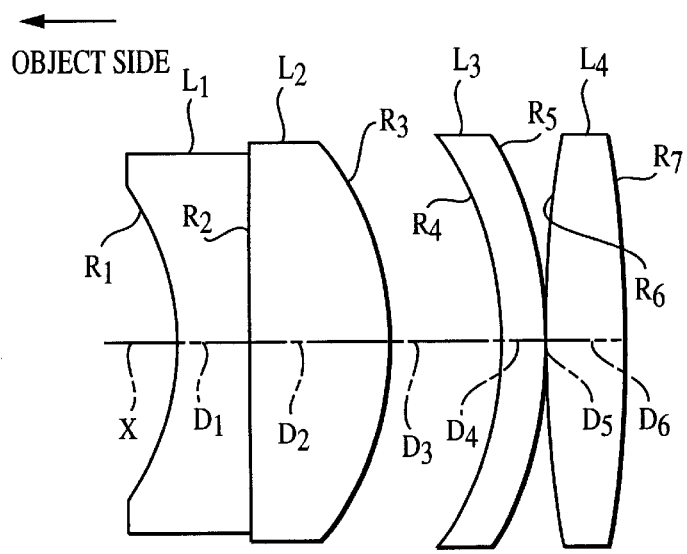
FIG. 10 shows the lens element configuration of Embodiment 4 of the present invention.

FIG. 10 shows the basic lens component configuration of the imaging lens of Embodiment 4. As shown in FIG. 10, there is arranged, in successive order from the most object side: a first lens component of negative meniscus shape with its concave surface on the object side, the first lens component being formed of a first lens element $L_1$ of negative meniscus shape joined to a second lens element $L_2$ of positive meniscus shape; a second lens component formed of a third lens element $L_3$ of negative meniscus shape with its concave surface on the object side; and a third lens component formed of a fourth lens element $L_4$ that is biconvex having surfaces of different curvature, with the surface of larger radius of curvature on the object side.

Table 7, below, lists surface number # in order from the object side, the radius of curvature R (in mm) of each surface, the on-axis spacing D (in mm) between surfaces, as well as the refractive index $N_d$ and Abbe number $v_d$ (at the sodium d line) of each lens component of Embodiment 4.

TABLE 7

| # | R | D | $N_d$ | $v_d$ |
|---|---|---|---|---|
| 1 | −23.842 | 3.854 | 1.75520 | 25.4 |
| 2 | −1983.238 | 7.133 | 1.77250 | 49.6 |
| 3 | −26.155 | 6.332 | | |
| 4 | −25.246 | 1.973 | 1.67003 | 47.2 |
| 5 | −31.543 | 0.133 | | |
| 6 | 188.500 | 4.003 | 1.72342 | 38.0 |
| 7 | −120.121 | 119.822 | | |

Table 8 below lists the focal length f of the imaging lens, the focal length $f_1$ of the first lens component formed of lens elements $L_1$ and $L_2$ that are joined, the focal length $f_2$ of the second lens component $L_3$, the focal length $f_3$ of the third lens component $L_4$, the overall length d of the imaging lens, the thickness $d_F$ of the first lens component (the combined thickness of $L_1$ and $L_2$), as well as the values of the $f/f_1$, $f_2/f$, $f_3/f$ and $d_F/d$. Thus, the above-noted Conditions (1)–(4) are each satisfied for this embodiment.

TABLE 8

| | |
|---|---|
| f = 100.00 | Condition (1) value: $f/f_1 = 0.37$ |
| $f_1$ = 268.34 | Condition (2) value: $d_F/d = 0.47$ |
| $f_2$ = −216.80 | Condition (3) value: $f_2/f = -2.17$ |
| $f_3$ = 102.55 | Condition (4) value: $f_3/f = 1.03$ |
| d = 23.43 | |
| $d_F$ = 10.99 | |

As is apparent from Table 8, this embodiment satisfies Conditions (1)–(4).

FIG. 11 shows the spherical aberration of the lens of Embodiment 4 when imaging collimated light. The spherical aberration when imaging collimated light is the wave front aberration of the lens for an object at infinity imaged onto a flat surface 20, as shown in FIG. 13.

FIGS. 12A–12C show the spherical aberration, astigmatism and distortion, respectively, of the lens of Embodiment 4 when imaging an object at unit magnification. FIG. 14 illustrates unfolded ray paths of the arrangement by which the aberrations shown in FIGS. 12A–12C are generated.

Moreover, as is clear from FIGS. 11 and 12, according to the present embodiment, both the spherical aberration of the lens when imaging collimated light, as required in relaying the reference beam via mirror 114 in FIG. 17, and the various aberrations of the lens when imaging an object at unit magnification, as required for the object beam in FIG. 17, are favorably corrected by the present invention.

FIG. 13 illustrates the lens of the present invention having lens components $L_1$, $L_2$, and $L_3$, in order from the object side, imaging collimated light (i.e., light as contained in the object beam) onto a flat surface 20.

FIG. 14 illustrates the unfolded ray paths for the lens of the present invention in an arrangement with a reflecting mirror similar to the arrangement illustrated by prior art lens 106 and mirror 114 of FIG. 17, but with the object 2a oriented normal to the optical axis of the lens.

Figure 15:
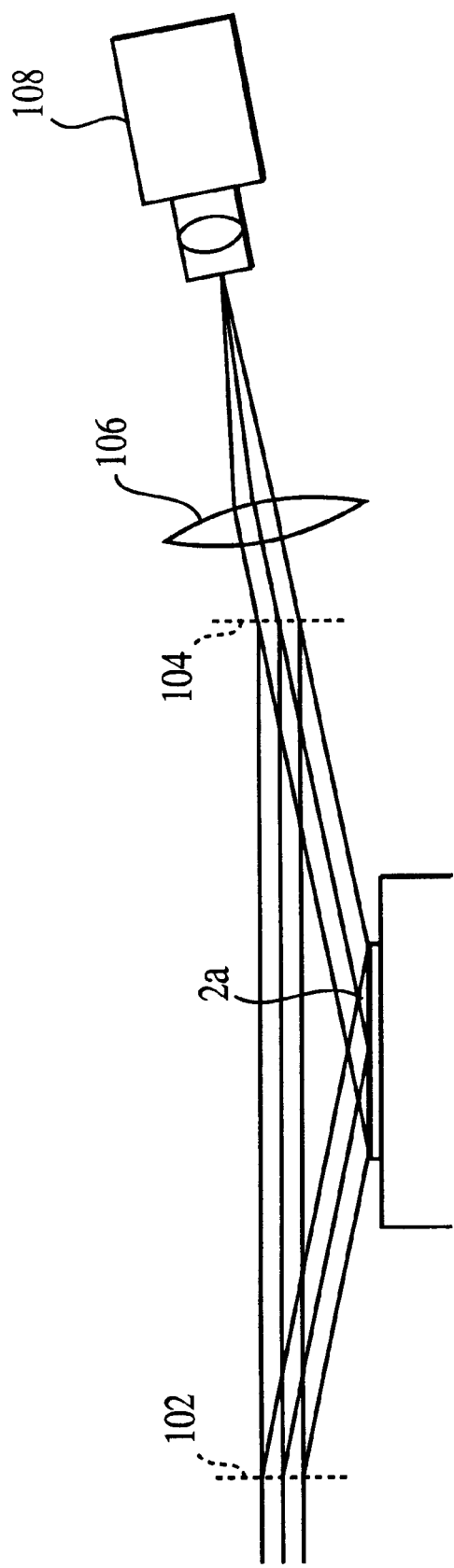
FIG. 15 is a schematic diagram for explaining a prior art interferometric device.
Figure 16:
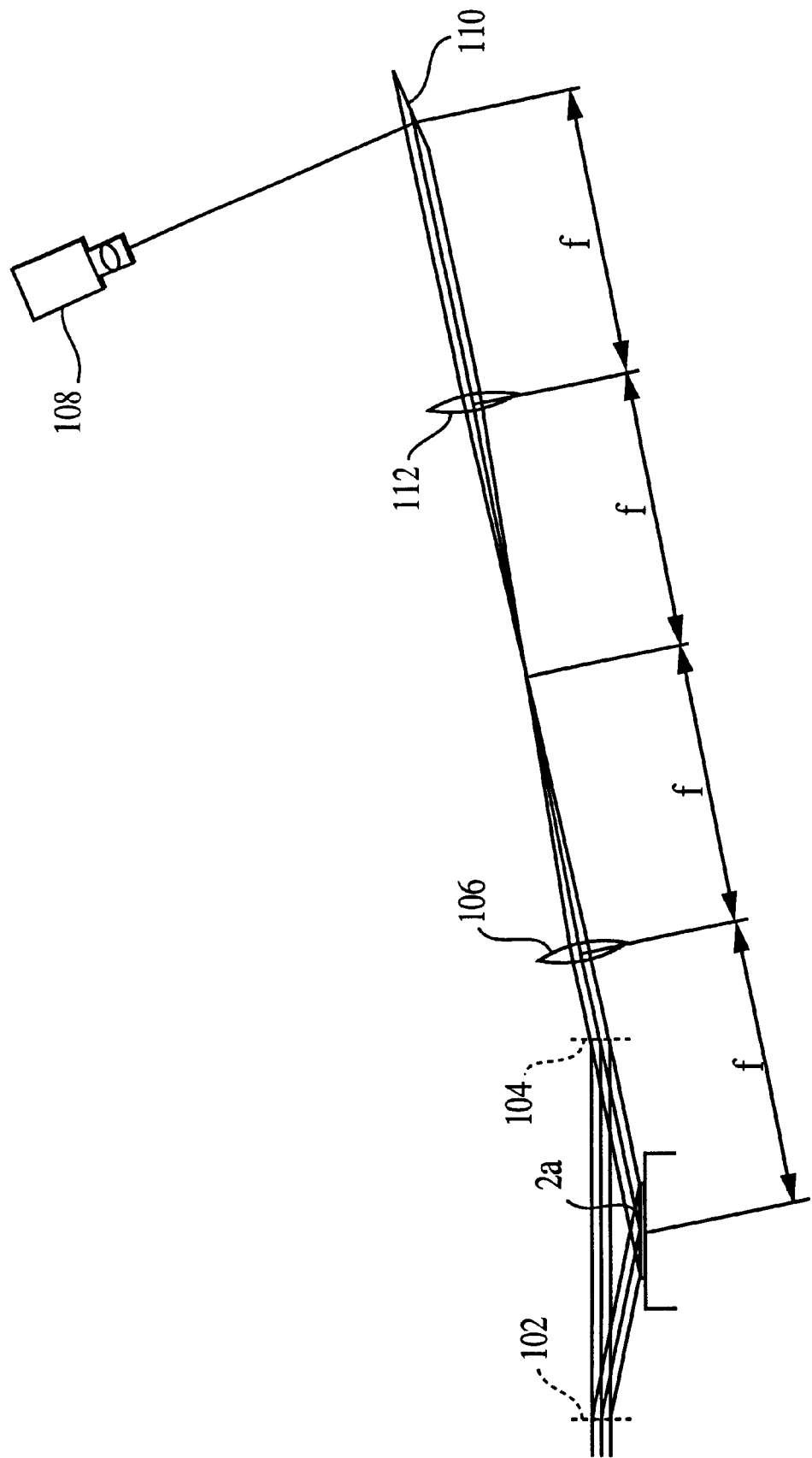
FIG. 16 is a schematic diagram for explaining another prior art interferometric device.

FIGS. 15 is a schematic diagram for explaining a prior art interferometric device, FIG. 16 is a schematic diagram for explaining another prior art interferometric device, and FIG. 17 is a schematic diagram for explaining still another prior art interferometric device.

As explained above, the imaging lens of the present invention is configured to specify the shapes of its three lens components and to satisfy specified conditions, so that the spherical aberration when relaying a collimated beam of light, and the spherical aberration, astigmatism, and distortion of the lens in imaging object 2a onto observation screen 110 in the arrangement shown in FIG. 17 are made favorable. As a result, even when the imaging lens of the present invention is arranged between a wave front combining means and a screen of a grazing incidence interferometric device, a point on a surface (such as surface 2a) will be imaged by the lens into a single point on the screen, and problems of the interference pattern being imprecise or distorted, as well as problems of there being blurriness of the interference pattern image at the periphery thereof will be minimized.

The invention being thus described, it will be obvious that the same may be varied in many ways. For example the number of lens elements in each lens group may be increased from those described. Also, a cover glass along with a low pass filter or an infrared cut-off filter may be inserted between the last surface of the imaging lens and the and an image surface. Such variations are-not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. An imaging lens, for use with interferometric device comprising, in successive order from the most object side of the imaging lens:

a first lens component;

a second lens component; and a third lens component;

wherein the first lens component is formed of a single lens element or multiple lens elements, said first lens component having a meniscus shape as a whole with a concave surface on the object side;

one lens component, of among the second lens component and the third lens component, has positive refractive power and the other lens component thereof has negative refractive power, and the following conditions are satisfied $$-0.1 < f/f_1 < 0.6$$

$$0.3 < d_F/d < 0.6$$

where f is the focal length of the imaging lens, $f_1$ is the focal length of the first lens component, $d_F$ is the distance between the surfaces of the first lens component that are nearest the object side and the image side, respectively, and d is the overall length of the imaging lens.

2. The imaging lens of claim 1 wherein, when the second lens component has negative refractive power and the third lens component has positive refractive power, the following conditions are satisfied $$-3.0 < f_2/f < -1.0$$

$$0.5 < f_3/f < 1.2$$

where $f_2$ is the focal length of the second lens component, and $f_3$ is the focal length of the third lens component.

3. The imaging lens of claim 1 wherein, when the second lens component has positive refractive power and the third lens component has negative refractive power, the following conditions are satisfied $$0.5 < f_2/f < 1.2$$

$$-3.0 < f_3/f < -1.0$$

where $f_2$ is the focal length of the second lens component, and $f_3$ is the focal length of the third lens component.

4. The imaging lens of claim 1 in combination with a screen and a grazing incidence interferometer having a wave front combining means, wherein the imaging lens is arranged between the wave front combining means and the screen.

5. The imaging lens of claim 2 in combination with a screen and a grazing incidence interferometer having a wave front combining means, wherein the imaging lens is arranged between the wave front combining means and the screen.

6. The imaging lens of claim 3 in combination with a screen and a grazing incidence interferometer having a wave front combining means, wherein the imaging lens is arranged between the wave front combining means and the screen.

* * * * *

UNITED STATES PATENT AND TRADEMARK OFFICE
CERTIFICATE OF CORRECTION

PATENT NO.    : 6,297,916 B1
DATED         : October 2, 2001
INVENTOR(S)   : Kanda et al.

Page 1 of 1

It is certified that error appears in the above-identified patent and that said Letters Patent is hereby corrected as shown below:

Column 6,
Line 48, change "$L_1.$" to -- $L_1$ --;
TABLE 4, in the second column, change "Condition (3) value:" to
-- Condition (5) value --; and change "Condition (4) value:" to
-- Condition (6) value --;

Column 7,
Line 51, change "TABLE 4" to -- TABLE 6 --; and

Column 8,
Table 7, in the fifth column, change "25.4" to -- 27.5 --.

Signed and Sealed this

Twenty-eighth Day of May, 2002

Attest:

JAMES E. ROGAN
Attesting Officer     Director of the United States Patent and Trademark Office